US011507868B2

(12) United States Patent
Kwong et al.

(10) Patent No.: US 11,507,868 B2
(45) Date of Patent: Nov. 22, 2022

(54) PREDICTING SUCCESS PROBABILITY OF CHANGE REQUESTS

(71) Applicant: The Toronto-Dominion Bank, Toronto (CA)

(72) Inventors: Helena Jane Kwong, Toronto (CA); Nitin Mahajan, Pickering (CA)

(73) Assignee: The Toronto-Dominion Bank, Toronto (CA)

( * ) Notice: Subject to any disclaimer, the term of this patent is extended or adjusted under 35 U.S.C. 154(b) by 300 days.

(21) Appl. No.: 16/592,254

(22) Filed: Oct. 3, 2019

(65) Prior Publication Data
US 2021/0103840 A1 Apr. 8, 2021

(51) Int. Cl.
*G06N 20/00* (2019.01)
*G06N 7/00* (2006.01)
*G06Q 10/06* (2012.01)

(52) U.S. Cl.
CPC ............ *G06N 7/005* (2013.01); *G06N 20/00* (2019.01); *G06Q 10/0631* (2013.01)

(58) Field of Classification Search
CPC ........ G06N 20/00; G06N 20/10; G06N 20/20; G06N 7/00; G06N 7/005; G06N 5/00; G06N 5/02; G06N 5/022; G06N 5/04
See application file for complete search history.

(56) References Cited

U.S. PATENT DOCUMENTS

| 9,946,767 B2 | 4/2018 | Chidlovskii | |
| 10,445,170 B1* | 10/2019 | Subramanian | G06N 7/005 |
| 2007/0100892 A1* | 5/2007 | Kephart | G06Q 10/06 |

(Continued)

FOREIGN PATENT DOCUMENTS

CN 105303262 2/2016

OTHER PUBLICATIONS

Wang et al., "Two Heads Better Than One: Metric+Active Learning and its Applications for IT Service Classification", 2009 https://ieeexplore.ieee.org/abstract/document/5360350 (Year: 2009).*

(Continued)

*Primary Examiner* — Alan Chen
*Assistant Examiner* — Shoun J Abraham
(74) *Attorney, Agent, or Firm* — Fish & Richardson P.C.

(57) ABSTRACT

The present disclosure involves systems, software, and computer-implemented methods for automatically predicting a probability of success or failure of change requests for an organization's information technology (IT) infrastructure or use environment. One example system includes at least one repository storing information corresponding to one or more prior change requests, at least one memory storing instructions and at least one prediction tool, and at least one hardware processor. Each change request corresponds to a request for a modification to one or more sections of the infrastructure. The instructions instruct the at least one hardware processor to receive one or more parameters corresponding to a new change request associated with the infrastructure. The parameters are provided as input to the at least one prediction tool, and in response, a probability of success of the new change request is received as an output of the at least one prediction tool.

21 Claims, 5 Drawing Sheets

(56) References Cited

U.S. PATENT DOCUMENTS

| | | | |
|---|---|---|---|
| 2010/0191952 A1* | 7/2010 | Keinan | G06Q 10/06 |
| | | | 713/100 |
| 2017/0147961 A1* | 5/2017 | Haas | G06Q 10/063118 |
| 2018/0247158 A1 | 8/2018 | Yang | |
| 2018/0276564 A1 | 9/2018 | Varma et al. | |
| 2018/0308011 A1* | 10/2018 | Kalia | G06F 11/073 |
| 2019/0108465 A1 | 4/2019 | Zhou et al. | |
| 2019/0164100 A1* | 5/2019 | Rotta | G06Q 10/067 |
| 2019/0251467 A1 | 8/2019 | Lokare et al. | |

OTHER PUBLICATIONS

Behrisch et al., "Commercial Visual Analytics Systems-Advances in the Big Data Analytics Field," IEEE Transactions on Visualization and Computer Graphics, vol. 25, Issue 10, Oct. 2019, 20 pages.

Czerwonka et al., "CRANE: Failure Prediction, Change Analysis and Test Prioritization in Practice - Experiences from Windows," Proceedings ICST 2011 Proceedings of the Fourth IEEE International Conference on Software Testing, Verification and Validation, pp. 357-366, Mar. 2011, 10 pages.

* cited by examiner

PREDICTING SUCCESS PROBABILITY OF CHANGE REQUESTS

TECHNICAL FIELD

The present disclosure relates to computer-implemented methods, software, and systems to predict a probability of success of change requests.

BACKGROUND

An organization, for example, a bank, usually has a change team, which is staffed by some of the organization's employees and which manages change requests received for various parts of the organization's information technology (IT) infrastructure or use environment. For example, the change team can manage upgrade requests for a customer online portal interface or a bug fix request for a backend application software tool.

SUMMARY

The present disclosure involves systems, software, and computer-implemented methods for automatically predicting, with a high degree of accuracy, a probability of success or failure of change requests for various parts of an organization's IT infrastructure or use environment. One example system includes at least one repository storing information corresponding to one or more prior change requests associated with an IT infrastructure of an organization, at least one memory storing instructions and at least one prediction tool, and at least one hardware processor interoperably coupled with the at least one memory and the at least one repository. Each change request corresponds to a request for a modification to one or more sections of the IT infrastructure. The instructions instruct the at least one hardware processor to receive one or more parameters corresponding to a new change request associated with the IT infrastructure. The one or more parameters are provided as input to the at least one prediction tool. In response to providing the one or more parameters as input to the at least one prediction tool, a probability of success of the new change request is received as an output of the at least one prediction tool.

Implementations can optionally include one or more of the following features. In some implementations, the instructions further instruct the at least one hardware processor to train the at least one prediction tool. The training comprises executing the at least one prediction tool; accessing the information corresponding to one or more prior change requests in the repository; providing, as input to the at least one prediction tool, the accessed information; and based on providing the accessed information as input to the prediction tool, configuring the at least one prediction tool to generate a target output.

In some implementations, providing the accessed information as input to the at least one prediction tool comprises determining, using the accessed information, a first subset of the one or more prior change requests that corresponded to successful changes; determining, using the accessed information, a second subset of the one or more prior change requests that corresponded to failed changes; comparing the first subset to the second subset; removing, based on the comparison, one or more change requests from one of the first subset or the second subset such that a difference between remaining numbers of change requests in the first subset and the second subset are within a threshold value; and providing information corresponding to the remaining numbers of change requests in the first subset and the second subset to the at least one prediction tool.

In some implementations, providing the accessed information as input to the at least one prediction tool comprises providing parameters corresponding to the one or more prior change requests as input to the at least one prediction tool, the parameters including a first parameter having a large number of possible values. The instructions instruct the at least one hardware processor to assign values of the first parameter corresponding to the one or more prior change requests to one of a number of specified groups, wherein the number of specified groups is less than the large number of possible values; and for each of the one or more prior change requests, provide as input to the at least one prediction tool, a respective specified group as a replacement of the first parameter.

In some implementations, providing the accessed information as input to the at least one prediction tool comprises providing parameters corresponding to the one or more prior change requests as input to the at least one prediction tool, each parameter having an associated weight representing an estimated impact of the parameter in effecting the requested modification; and configuring the at least one prediction tool comprises adjusting weights of one or more parameters to vary the output generated by the at least one prediction tool.

In some implementations, the output of the at least one prediction tool further comprises at least one of (i) an ordering of the parameters in accordance with estimated impact of each parameter in effecting the requested modification, or (ii) one or more recommendations for modifying the new change request. In some implementations, the one or more recommendations for modifying the new change request comprises recommendations for modifying at least one of the one or more parameters, or modifying one or more tasks to be performed to effect a requested modification associated with the new change request.

In some implementations, the instructions further instruct the at least one hardware processor to: store the output received from the at least one prediction tool in a database. In some implementations, storing the output in a database comprises storing the output along with information corresponding to the new change request in the at least one repository.

In some implementations, the system comprises a graphical user interface (GUI) tool that is interoperably coupled with the at least one hardware processor. The instructions instruct the at least one hardware processor to provide the output received from the at least one prediction tool to the GUI tool, wherein the GUI tool is configured to generate one or more user interfaces for display, the output being displayed using one of the one or more user interfaces. In some implementations, the GUI tool is further configured to: enable a user to enter, using an input mechanism coupled to the GUI tool, the one or more parameters corresponding to the new change request, including enabling the user to adjust values associated with the one or more parameters to vary the probability of success of the new change request output by the at least one prediction tool; and provide the one or more parameters entered by the user to the at least one hardware processor.

In some implementations, the instructions instruct the at least one hardware processor to: compare the probability of success of the new change request output by the at least one prediction tool to one or more threshold values; and in response to determining that the probability of success satisfies one or more criteria corresponding to the one or more threshold values, approve execution of the new change request, wherein a change request team of the organization is tasked with implementing a modification of the IT infrastructure corresponding to the new change request.

In some implementations, the instructions further instruct the at least one hardware processor to: analyze the one or more parameters corresponding to the new change request using the information corresponding to the one or more prior change requests stored in the repository; determine, based on the analysis, a risk of failure of the new change request; compare the risk of failure to one or more threshold values; and in response to a determination, based on the comparison, that the risk of failure is greater than the one or more threshold values, generate an alert about the risk of failure, wherein the alert triggers additional scrutiny of the new change request by a change request team of the organization.

In some implementations, least one of the information corresponding to the one or more prior change requests or one or more parameters corresponding to the new change request includes one or more of the following: number of members of a change request team of the organization assigned to implement the respective modification, experience level of the members assigned to implement the respective modification, number of tasks to be performed to implement the respective modification, whether a time period assigned to implement the respective modification is a normal time period or an expedited time period, a level of complexity of the change request, a requester who is requesting the change request, a level of difficulty in realizing the respective modification, a level of risk in implementing the respective modification, a weight assigned to a parameter, whether the prior change request was approved and the respective modification implemented, whether the respective modification for a prior change request was successful or failed, or, for a failed modification of a prior change request, level of severity of an impact of the failure on the IT infrastructure of the organization.

In some implementations, the at least one prediction tool includes a machine learning algorithm that is one of an artificial neural network, or a decision tree algorithm having one or more of feature importance or gradient boosting.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

In some cases, the change team of an organization, which can be, for example, a bank or a financial institution, among other types of organizations, follows a structured change management process to control the life cycle of requested changes, with the objective of implementing changes with minimum disruption to the organization's IT systems or services, or both. As part of the process, a group in the organization herein referred to as the Change Approval Board (CAB), which includes decision makers of the organization or some members of the change team, or both, reviews change requests to ensure that requested changes are recorded, evaluated and planned, and implemented in a controlled manner. Conventionally, the CAB review involves human prediction, for example, by members of the CAB, about the success or failure probability of a change request, or its impact on the organization's IT infrastructure, or both, based on prior experience and user knowledge of the CAB members. In this context, success of a change request indicates that the change can be, or was, implemented satisfying the constraints specified by the change team and provides the functionalities that prompted the request, without adversely affecting on other systems and/or services of the organization's IT infrastructure. A change request is deemed to fail when any of these is not true: implementation of the change request violates the specified constraints, the change does not adequately provide the envisioned functionalities, or causes unexpected adverse impact on other systems and/or services of the organization's IT infrastructure, or any combination of these.

Despite the structured change management process, including review by the CAB, changes sometimes fail when implemented. Failed changes can directly impact the organization's internal and external customers, negatively impacting customer satisfaction and the organization's reputation. A failure can also cause resource wastage, since the failure leads to additional efforts by the change team or those involved in implementing the change, or both, to resolve the issues that caused the requested change to fail.

The present disclosure describes various techniques that use prediction tools to automatically predict a probability of success (or probability of failure, depending on the implementation) of change requests made for changes to various parts of an organization's IT infrastructure or use environment. In this context, an organization's IT infrastructure or use environment refers to IT systems and services belonging to and/or managed by the organization, which includes, for example, front-end web services such as customer websites, mobile device applications, or other online portals; and back-end systems and services such as servers hosting the customer websites, routers, switches, among others. Examples of change requests to various parts of the IT infrastructure include, for example, changes to a customer online portal interface or a bug fix request for a backend software tool used by employees of the organization. Using the disclosed techniques, the success probability of a change request can be predicted in an automated manner based on analyzing parameters of the change request in view of knowledge of prior change requests, with a degree of accuracy greater than that obtainable with human estimation. Although the disclosed techniques are described herein, for ease of description, as outputting probabilities of success of change requests, the techniques are equally applicable to outputting probabilities of failure of change requests, or both.

The disclosed techniques allow the organization to remove human error or variability from the process of reviewing change requests before they are implemented, such that possibility of failure in implementing the change requests is reduced. In doing so, the risk of negative impacts across the organization's IT infrastructure due to a failed change is minimized.

As described in greater detail below, in some implementations, the prediction tools enable the organization's change team to visualize the importance of different parameters of a change request, for example, a number of people assigned to implement the change or a number of tasks to be performed to implement the change, among others, on the success probability of the change request. In some cases, the prediction tools allow the change team to adjust values or weights of the parameters to modify the success probability.

In some implementations, the prediction tools provide recommendations to the change team to improve the success probabilities of change requests. For example, the prediction tools can suggest use of additional resources, or modifying underlying tasks, to implement a requested change. In some implementations, the prediction tools identify change requests that are more likely to fail or whose failure is likely to have a significant negative impact on the organization's IT infrastructure, or both, and alert the change team to the risks associated with these change requests. This enables the change team or the organization's management, or both, to focus effort on managing change requests that are more likely to fail, which can lead to improvement in operations, avoid potentially costly rework, or potential downtime of applications or equipment.

In some implementations of the present solution, the organization uses a prediction tool that is implemented using one or more software processes and that executes a machine learning (ML) algorithm to assess the risk of individual change requests. The parameters of a change request are provided as inputs to the software prediction tool. The ML algorithm processes the input parameters and provides, as an output, an estimate of the probability of success of the change request. For example, the prediction tool can output an estimate showing a 98% success probability for a change request, which indicates that the ML algorithm has determined that there is a 98% probability that the corresponding change request can be implemented without any negative incident. The ML algorithm is trained using historical data about prior change requests, which are stored in a repository, and the algorithm uses this knowledge to determine the output.

In some implementations, the prediction tool is integrated with other software processes or tools that enable a user, for example, a member of the change team, to visualize the predicted probability of success and interact with the data. For example, the prediction tool can forward the output of the ML algorithm to a visualization tool that displays the estimated or predicted probability of success on a graphical user interface (GUI) presented on a computer device. A member of the change team can adjust values of the input parameters of the change request to see how the probability estimate output by the prediction tool can vary.

In some implementations, the prediction tool outputs, in addition or as an alternative to the success probability estimate of a change request, a ranking of the various input parameters for the change request. The ranking of the parameters indicates their respective individual impacts on the success probability of the change request. For example, a first parameter can be the skill level of developers implementing the requested change and a second parameter can be time taken by the developers to complete the change, with the first parameter having a greater impact on the success probability of the change request. In this case, the prediction tool can rank the first parameter higher than the second parameter. In some cases, the prediction tool sends the ranking to the visualization tool, which can present the rankings on the GUI, for example, as a graphic in which the parameters are arranged according to their respective individual rankings.

In some implementations, the prediction tool determines modifications to one or more parameters of a change request that can increase the success probability of the change request. For example, by analyzing a current change request in view of historical data about prior similar change requests, the prediction tool can determine that additional developers or more experienced developers, compared to those specified by the parameters that have been input, would increase the success probability. The prediction tool can provide corresponding recommendations for adjustments to the parameters of the change request, in addition or as an alternative to outputting the success probability estimates. The prediction tool can send the recommendations to the visualization tool, which can accordingly present visualizations on the GUI that shows how changes in the parameters, for example, adding developers, would change the success probability.

In some implementations, the prediction tool uses artificial intelligence (AI) algorithms to predict the success probabilities of change requests, in addition or as an alternative to the ML algorithms. In some of these implementations, the AI algorithms are configured to auto-approve change requests. For example, if an AI algorithm that is used determines that the success probability of a change request is above a certain threshold value (for example, above 95% probability of success), then the AI algorithm automatically approves implementation of the requested change, without requiring review or approval from members of the change team.

Figure 1:
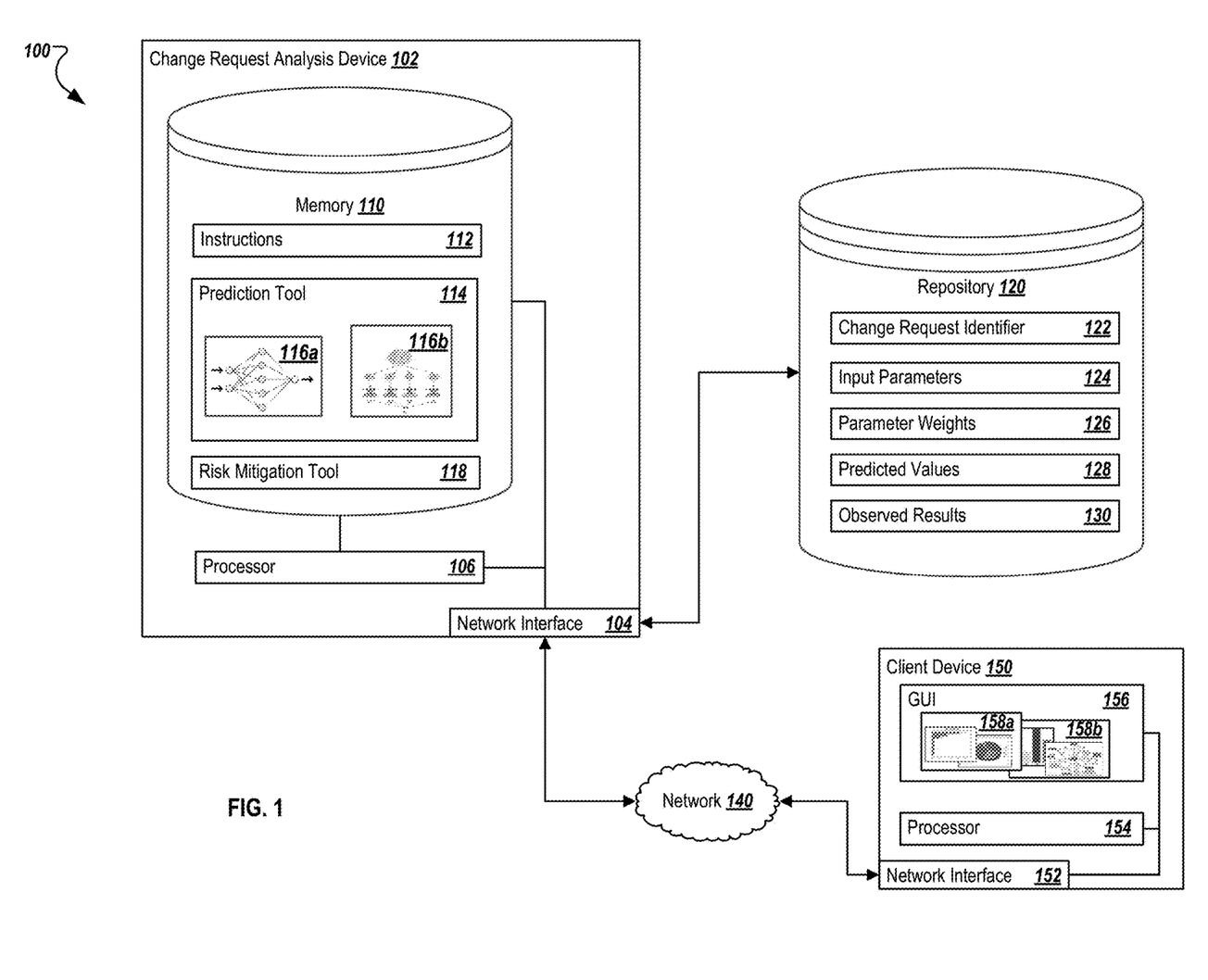
FIG. 1 is a block diagram illustrating an example system for automatically predicting probability of success of a change request for an organization's IT infrastructure.

Turning to the illustrated example implementation, FIG. 1 is a block diagram illustrating an example system 100 for automatically predicting probability of success of a change request for an organization's IT infrastructure. As shown, the system 100 includes a change request analysis device 102, a repository 120 that is communicably coupled to the change request analysis device 102, and a client device 150 that is communicably coupled to the change request analysis device 102 through a network 140. In some implementations, the change request analysis device 102, the repository 120 and the client device 150 are associated with (for example, owned or used by) an organization, and are used to review change requests that are submitted for changes to one or more portions of the organization's IT infrastructure, and predict success probabilities of the change requests. In some instances, one or more of the change request analysis device 102, the repository 120, or the client device 150, are managed by the change team of the organization.

In general, the system 100 allows the illustrated components to share and communicate information across devices and systems (for example, change request analysis device 102 and client device 150, among others, through network 140). In some instances, the change request analysis device 102 is a cloud-based component or system that is remotely connected to client devices, such as client device 150, through public or private networks or a combination of the two. In some instances, the change request analysis device 102 is a non-cloud-based component or system that is proximally connected to the client device 150, such as in an on-premise system configuration, a client-server application, applications running on one or more client devices, or combinations thereof. Although components are shown individually, in some implementations, functionality of two or more components, systems, or servers may be provided by a single component, system, or server.

As used in the present disclosure, the term "computer" is intended to encompass any suitable processing device. Change request analysis device 102 or client device 150, or both, can be any computer or processing device such as, for example, a blade server, general-purpose personal computer (PC), Mac®, workstation, UNIX-based workstation, or any other suitable device. Moreover, although FIG. 1 illustrates a single change request analysis device 102, the system 100 can be implemented using a plurality of change request analysis devices, such as a server pool, as well as computers other than servers. In other words, the present disclosure contemplates computers other than general-purpose computers, as well as computers without conventional operating systems. Similarly, the client device 150 can be any system that can interact with the change request analysis device 102, receive inputs from users, for example, members of the change team, and display information, for example, outputs of the prediction tool, using a GUI. The client device 150 can be a desktop computer, a laptop computer, a television with computer processing capabilities, a smart display device, or a mobile device, such as a smartphone, tablet, smartwatch, portable music player, electronic book reader, or any other suitable mobile computing device. In general, each illustrated component may be adapted to execute any suitable operating system, including Linux, UNIX, Windows, Mac OS®, Java™, Android™, Windows Phone OS, or iOS™, among others. The client device 150 may include one or more specific applications executing on the client device 150, or the client device 150 may include one or more Web browsers or web applications that can interact with particular applications executing remotely from the client device 150, such as processes executed by the change request analysis device 102.

As illustrated, the change request analysis device 102 includes or is associated with a network interface 104, processor(s) 106, and memory 110. The memory 110 includes instructions 112 that are executed by the processor(s) 106 to perform various operations. The memory 110 also includes a prediction tool 114, which is used by the processor(s) 106 to analyze change requests and predict success probabilities of the change requests, among other outputs. As shown, in some instances, the prediction tool 114 implements one or more algorithms, such as algorithms 116a and 116b, which are used to review change requests and predict success probabilities of the change requests, among other outputs. In some implementations, the memory 110 further includes a risk mitigation tool 118, which is used by the processor(s) 106 to analyze and flag, for the change team, change requests that have a higher risk of failure. Details of the various tools are described in the following sections.

The network interface 104 is used by the change request analysis device 102 for communicating with other systems in a distributed environment—including within the system 100—connected to the network 140, for example, the repository 120 and the client device 150, and other systems communicably coupled to the change request analysis device 102 and/or network 140. Generally, the network interface 104 comprises logic encoded in software and/or hardware in a suitable combination and operable to communicate with the network 140 and other components. More specifically, the network interface 104 may comprise software supporting one or more communication protocols associated with communications such that the network 140 and/or interface's hardware is operable to communicate physical signals within and outside of the illustrated system 100. Still further, the network interface 104 may allow the change request analysis device 102 to communicate with the repository 120 and/or the client device 150, and others, to obtain and/or provide information regarding one or more change requests. Based on this information, the change request analysis device 102 can obtain and analyze change requests and predict success probabilities of change requests.

The network 140 facilitates wireless or wireline communications between the components of the system 100 (for example, between the change request analysis device 102 and the client device(s) 150), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 can facilitate communications between senders and recipients. In some instances, one or more of the illustrated components (for example, the change request analysis device 102) may be included within or deployed to network 140 or a portion thereof as one or more cloud-based services or operations. In some instances, the network 140 is all or a portion of an enterprise or secured network, while in another instance, at least a portion of the network 140 represents a connection to the Internet. In some instances, a portion of the network 140 is a virtual private network (VPN). Further, all or a portion of the network 140 can comprise either a wireline or wireless link. Example wireless links may be based on Wi-Fi technologies such as 802.11a/b/g/n/ac/ax, or cellular technologies such as 2G, 3G, WiMAX, LTE, 5G, or 6G, and/or include any other appropriate wireless link. In other words, the network 140 encompasses any internal or external network, networks, sub-network, or combination thereof operable to facilitate communications between various computing components inside and outside the system 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Although FIG. 1 shows that the change request analysis device 102 includes a single processor 106, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Generally, the processor 106 accesses the instructions 112 and/or the prediction tool 114 from the memory 110, which are executed by the processor 106 to perform the operations of the change request analysis device 102. Specifically, the processor 106 executes the algorithms and operations for reviewing change requests and predicting corresponding success probabilities and/or providing recommendations about the change requests, which are described in the illustrated figures, as well as the various software modules and functionality, including the functionality for sending output of the prediction tool 114 to, and receiving user input transmissions from, client device 150, as well as to other devices and systems. Each processor 106 may have a single or multiple cores, with each core available to host and execute an individual processing thread. Further, the number of, types of, and particular processors 106 used to execute the operations described herein may be dynamically determined based on a number of requests, interactions, and operations associated with the change request analysis device 102.

Memory 110 may represent a single memory or multiple memories. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 stores various objects or data, including instructions 112, prediction tool 114, change request data, and any other appropriate information associated with the change request analysis device 102, including any parameters, variables, algorithms, instructions, rules, constraints, or references thereto. Additionally, the memory 110 may store any other appropriate data, such as VPN applications, firmware logs and policies, firewall policies, a security or access log, print or other reporting files, as well as others. While illustrated within the change request analysis device 102, memory 110 or any portion thereof, including some or all of the particular illustrated components, may be located remote from the change request analysis device 102 in some instances, including as a cloud application or repository, or as a separate cloud application or repository when the change request analysis device 102 itself is a cloud-based system. In some instances, some or all of memory 110 may be located in, associated with, or available through one or more other systems of the associated organization.

Repository 120 may represent a single repository or multiple repositories. The repository 120 may include any database module or storage memory, and may take the form of a SQL server database, Oracle database, IBM DB2, Microsoft Access, an object database, or any other suitable database. While illustrated as being a standalone repository external to the change request analysis device 102, repository 120 or any portion thereof, including some or all of the particular illustrated components, may be included in the change request analysis device 102 in some instances, including as part of the memory 110. In some instances, some or all of repository 120 may be located in, associated with, or available through one or more other systems of the associated organization. As illustrated in FIG. 1, in some instances, the repository 120 communicates directly with the change request analysis device 102 through the network interface 104. This may be the case, for example, when the change request analysis device 102 and the repository 120 are co-located on the same premises and connected by a LAN, for example, in the offices of the change request team. However, in other instances, the repository 120 communicates with the change request analysis device 102 through the network 140. This may be the case, for example, when the change request analysis device 102 and the repository 120 are remotely located from each other.

The repository 120 stores various objects or data associated with change requests, among other information. In some implementations, the repository 120 stores historical data about change requests, for example, information about prior change requests that had been made for changes to the organization's IT infrastructure. For example, in some instances, the repository 120 stores database entries, with the entries including information about the prior change requests. FIG. 1 illustrates an example of the information included in an entry in the repository 120. As shown, the information includes a change request identifier 122 that identifies a particular prior change request that was made, and acts as key to access the corresponding information in the repository 120.

The information about the prior change request in the repository 120 includes input parameters 124. An input parameter can be any value that is needed by the processor 106 to analyze a change request using the prediction tool 114. Examples of input parameters 124 include, without limitation:

(i) A number of people assigned to implement the corresponding change, for example, software developers, IT professionals, change team members, among others.
(ii) Experience level(s) of the people assigned to implement the change.
(iii) Number of tasks to be performed to implement the change. For example, a number of software modules or applications that has to be modified for the change, or the level of post-modification testing required, among other tasks.
(iv) Priority level of the change, for example, a normal change to be performed in due course, or an expedited change that has greater urgency and takes precedence over normal changes.
(v) Level of complexity of the change, for example, whether just a simple font change of a user interface, or a more complex replacement of a backend database. In some implementations, the number of tasks for a change and the level of complexity of the change are directly correlated: more the number of tasks or systems involved in a change, greater the complexity of the change request.
(vi) Identity of the person requesting the change. For example, whether the change request is from a customer of the organization or from an employee. In some implementations, the priority level of a change and the identity of the person requesting the change are directly correlated. For example, change requests from customers can take precedence over change requests from internal employees, since the former can have a greater impact on customer satisfaction.
(vii) Risk in implementing the change. For example, the extent to which a failed change can negatively impact other components of the organization's IT infrastructure.
(viii) Day and/or time scheduled for implementing the change. For example, what day of the month and what hours are more prone to failure or likely to succeed.

In some implementations, weights are associated with the input parameters to reflect the relative importance of the parameters for the corresponding change request, and these weights are stored in the repository entry as parameter weights 126. In such implementations, parameters that are determined, by the requester or the change team, or both, to be more important to successfully implement the change can have higher weight than less important parameters. For example, the number of people assigned to implement a change or the experience level(s) of the people assigned can be more important than the priority level of the change. In this case, the number of people parameter or the experience level parameter, or both, can have higher weights compared to the priority level parameter.

In some implementations, a change request entry in the repository 120 includes predicted values 128, which specifies the success probability that was determined for the change request by the change request analysis device 102 using the prediction tool 114. The predicted values 128 can also include other outputs by the prediction tool 114, such as recommendations for modifications to the change request, or outputs by the risk mitigation tool 118, such as alerts for high-risk change requests.

In some implementations, a change request entry in the repository 120 includes observed results 130, which indicates whether, for a change that was implemented, whether the change was successful or failed. In some cases, for implemented changes that failed, the observed results 130 provide information on what was the negative impact of the failure on the organization's IT infrastructure, such as which systems and/or services of the organization, if any, were negatively affected by the failure of the change. For example, a change request may have been to add a popup window feature to an online customer portal of the organization to display account information to customers. Software errors to implement the change may have caused some other portions of the customer portal to have become unresponsive, leading to extended downtime of the customer portal as the errors were fixed. The observed results 130 can provide information about this downtime of the customer portal, for example, which portions of the customer portal had become unresponsive, for how long, and what was the additional effort to fix the errors. In some cases, the observed results 130 also indicate whether the corresponding change request was approved and implemented.

The change request analysis device 102 includes, among other components, several applications, entities, programs, agents, or other software or similar components capable of performing the operations described herein. Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. Each software component may be fully or partially written or described in any appropriate computer language including C, C++, JavaScript, Java™, Visual Basic, assembler, Python, Peri®, XML, any suitable version of 4GL, among others.

As illustrated, the change request analysis device 102 includes or is associated with a prediction tool 114 stored in the memory 110. The prediction tool 114 can be any application or program associated with or connected to the change team of the organization and can include applications linking the change request analysis device 102 to the change request information stored in the repository 120 and/or the client device 150. The prediction tool 114 in the current description provides an application that is executed by the change request analysis device 102 using the processor 106 to determine success probabilities of change requests.

The prediction tool 114 includes one or more algorithms 116a and 116b that are trained using the historical data, for example, information about prior change requests that are stored in the repository 120 and described above. In some implementations, the algorithms 116a and 116b are ML algorithms, including, for example, neural network (NN) algorithms or decision tree algorithms with feature importance and gradient boosting, or both. The algorithms 116a and 116b can also include other types of ML algorithms in other cases, for example, support vector machine (SVM) algorithms, linear or logistic regression algorithms, random forest algorithms, among other suitable types. In some implementations, in addition or as an alternative to ML algorithms, the algorithms 116a and 116b include one or more artificial intelligence (AI) algorithms. The AI algorithms, when implemented, use one or more of the ML algorithms outlined above, and is configured to make automated decisions about the change requests based on the output of the constituent ML algorithms.

In some implementations, the change request analysis device 102 receives as input parameters of one or more change requests, for example, parameters similar to the input parameters 124. The change request also includes, in some cases, a detailed plan for implementing the change request, including a listing of all actions to be performed and identification of all the failure possibilities. The change request analysis device 102 provides the parameters to the prediction tool 114 that is executed by the processor 106. The prediction tool 114 computes a success probability of the change request using one or more of the algorithms 116a and 116b, which have been trained using information about prior change requests that are stored in the repository 120. The change request analysis device 102 provides the success probability output by the prediction tool 114 to the client device 150 or to the repository 120 for storage.

One or more client devices 150 are present in the system 100. A client device 150 includes, among other components, a network interface 152 for communication (similar to or different from network interface 104), at least one processor 154 (similar to or different from processor 106), and a display that provides a graphical user interface (GUI) 156. In some instances, the client device 150 includes an input device, such as a keypad, touch screen, or other input/output mechanisms that enable user interaction with one or more client applications, such as one or more front-end user interface (UI) tools displayed on the GUI 156.

In some implementations, a front-end UI tool provides one or more dashboards 158a and 158b that convey information associated with the operation of the prediction tool 114 to a user of the client device 150, for example, a member of the change team of the organization. Such information may include, for a change request, the success probability estimated by the prediction tool 114. In some implementations, the information may include, in addition or as an alternative to the success probability, recommendations for modifying the plan for implementing the change request, for example, recommendations to add more developers implementing the change request. In some implementations, the front-end UI tool enables the user to enter information, for example, input parameters, for one or more change requests and obtain corresponding success probability estimates. Additionally or alternatively, the UI tool enables the user to visualize the importance and/or impact of various parameters on the success probability of a change request. In some cases, the UI tool enables the user to adjust weights of the input parameters to vary the success probability. As shown, the front-end UI tool can display multiple dashboards 158a and 158b, among others, on the GUI 156, to utilize and present insights about the change request from the prediction tool 114.

The client applications executing on the client device 150, for example, the front-end UI tool corresponding to the dashboards 158a and 158b, can include any suitable application, program, mobile app, or other component. The front-end UI tool interacts with the applications running on change request analysis device 102, for example the prediction tool 114, via the network 140. In some instances, the front-end UI tool or the prediction tool 114, or both, include application programming interface (API) hooks that allow the applications to talk to one another. In some instances, the front-end UI tool can be a standalone third party application, for example, Tableau™ dashboard application. In some other instances, the front-end UI tool can be a web browser, or a remote agent, component, or client-side version of the prediction tool 114, or another component. In some instances, the front-end UI tool may interact directly with the repository 120 or portions thereof, and access historical data from the repository 120, to present analysis and insights about change requests on the dashboard 158a and/or 158b.

In some implementations, the change request analysis device 102 includes or is associated with a risk mitigation tool 118 stored in the memory 110. The risk mitigation tool 118 can be any application or program associated with or connected to the change team of the organization and can include applications linking the change request analysis device 102 to the change request information stored in the repository 120 and/or the client device 150. Although a separate application in some implementations as shown, the risk mitigation tool 118 is a part of the prediction tool 114 in some other implementations.

The risk mitigation tool 118 in the current description provides an application that is executed by the change request analysis device 120 using the processor 106 to identify change requests that have a higher risk of failure. In some implementations, the risk mitigation tool 118 analyzes historical data, for example, information about prior change requests access from the repository 120, to create a change failure profile, which identifies characteristics of change requests that are indicative of heightened probabilities of failure. Using the change failure profile that is based on historical data, the risk mitigation tool 118 analyzes an incoming change request, for example, by comparing the parameters of the change request to the identified characteristics and determining whether the parameters are within certain thresholds of the identified characteristics. Based on the analysis, the risk mitigation tool 118 determines whether the change request has a higher risk of failing. The risk mitigation tool 118 flags change requests that are identified as having risks of failure higher than certain selected levels, and provides the information to the front-end UI tool for alerting the user. The flagged change requests are subjected to extra scrutiny by the change team to reduce the failure risk, for example, by adjusting the input parameters of the change request. Change requests have different implementations in IT systems that require execution of various tasks, across different hardware, software, business applications and services for maintenance, upgrades, new releases and other initiatives. Risk analysis using the risk mitigation tool 118 benefits the change team, application teams and management of the organization to focus effort on changes that are likely to fail. This can lead to improved operations of the IT infrastructure of the organization, and avoid rework and potential downtime of applications and equipment.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
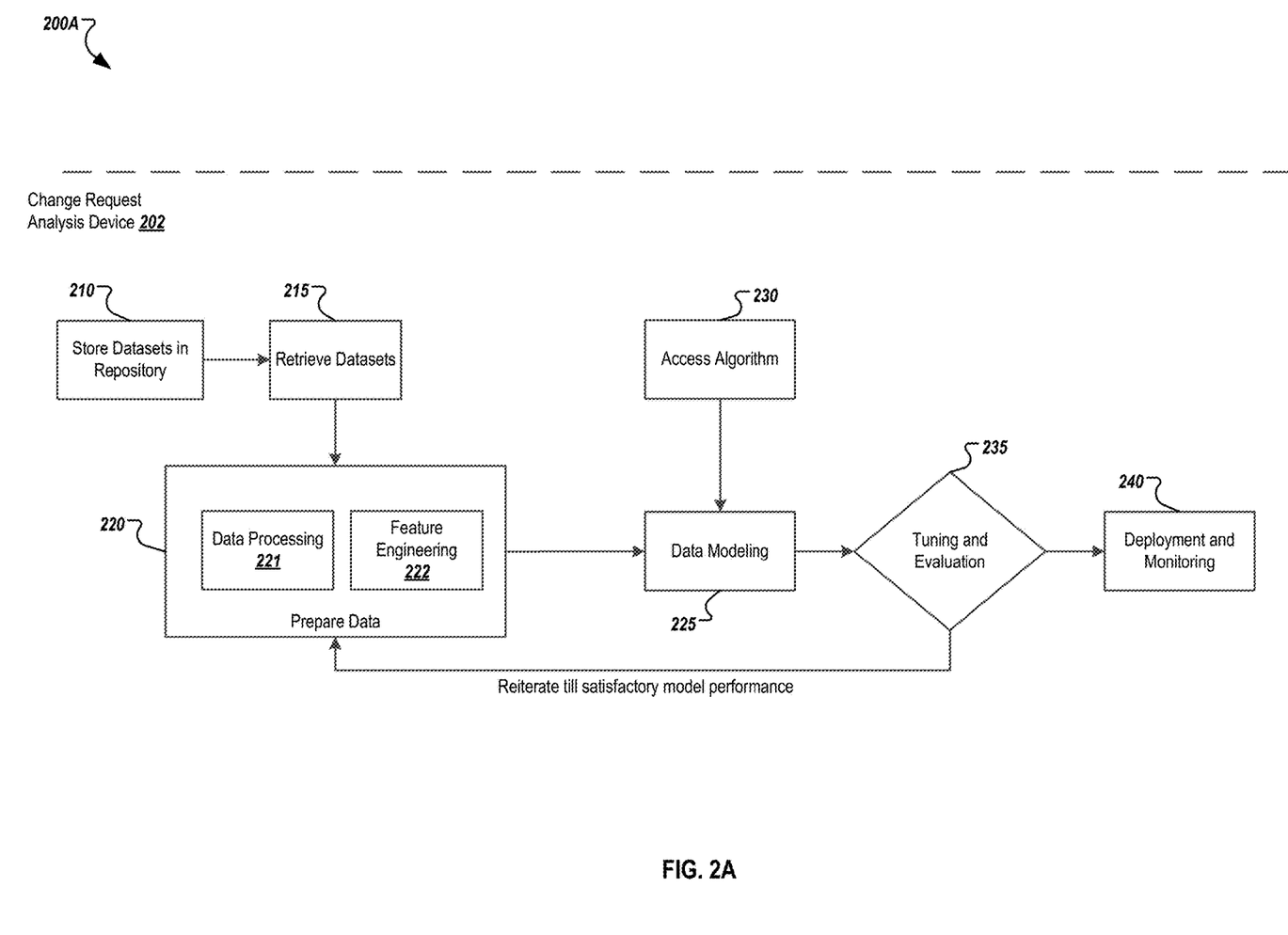
FIGS. 2A and 2B are flow chart diagrams of an example implementation for training a prediction tool and using the prediction tool to predict probability of success of a change request described herein.
Figure 2B:
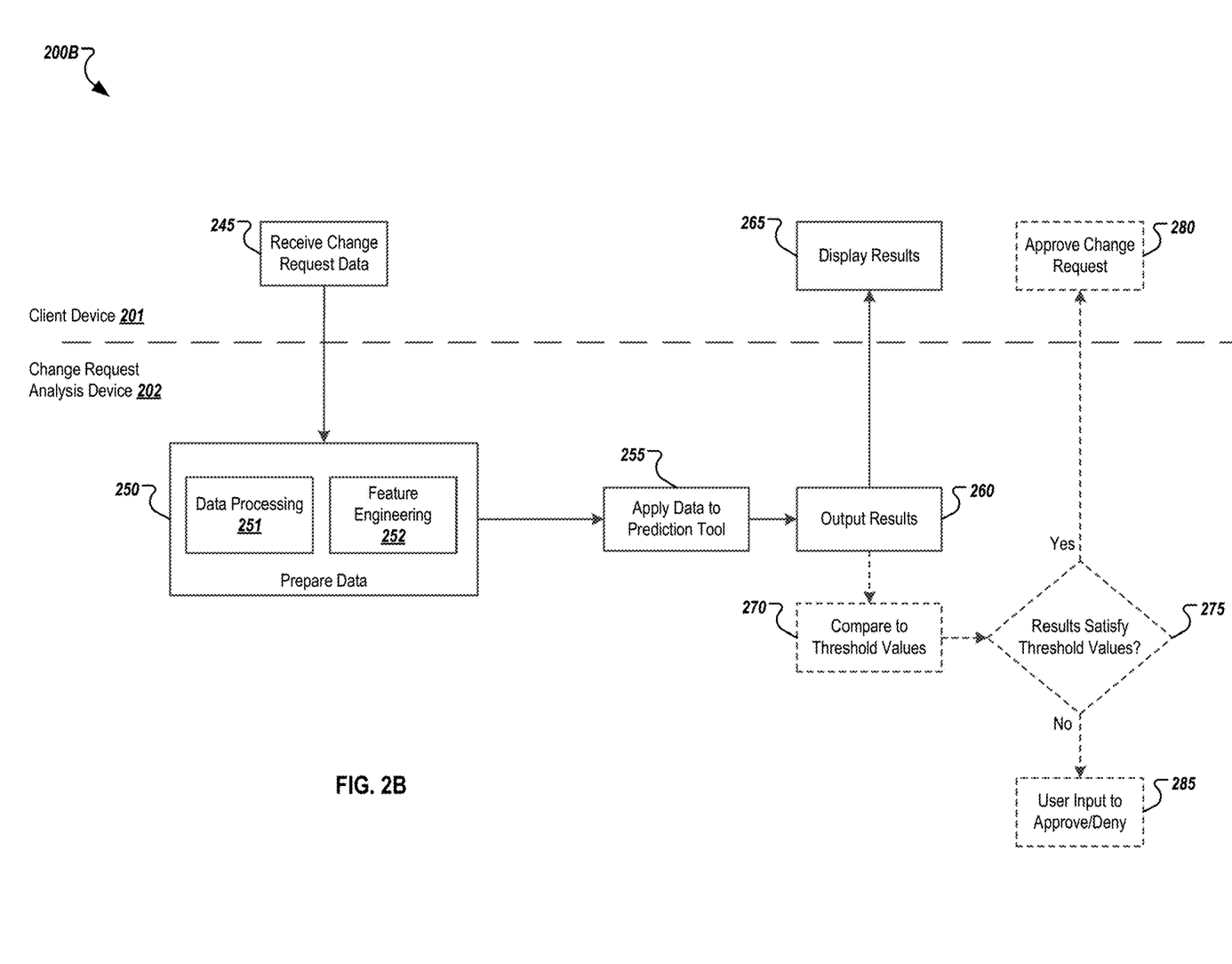

FIGS. 2A and 2B are flow chart diagrams of processes 200A and 200B, respectively, of an example implementation for training a prediction tool and using the prediction tool to predict a probability of success of a change request described herein. Process 200A shown in FIG. 2A provides an example series of operations performed by a change request analysis device 202 to train a prediction tool that is used to estimate success probabilities for change requests in an organization, while process 200B of FIG. 2B provides an example series of interactions between the change request analysis device 202 and a client device 201 to analyze a change request and provide outputs about the change request, including a corresponding success probability.

In some implementations, the change request analysis device 202 and the client device 201 are respectively similar to the change request analysis device 102 and the client device 150 discussed with respect to the system 100. In such implementations, the prediction tool that is trained as described with respect to the process 200A and deployed/used as described with respect to the process 200B, is similar to the prediction tool 114. The prediction tool includes one or more algorithms, such as algorithms 116a and 116b included in the prediction tool 114. In some implementations, the algorithms include machine learning algorithms, which are trained using the process 200A.

As shown in FIG. 2A, in the process 200A, the change request analysis device 202 stores datasets in a repository (210). For example, as described previously, information about prior change requests are stored in a repository, such as repository 120. As the change request analysis device 202 analyzes new change requests that come in using the prediction tool, in some instances the output of the prediction tool is sent, along with the parameters the change request, to the repository, where the change request is stored as a new entry.

The change request analysis device 202 trains the machine learning algorithm(s) included in the prediction tool using the information about prior change requests that are stored in a repository. The change request analysis device 202 retrieves the dataset from the repository (215) and prepares the data for training (220). Preparing the data for training includes data processing (221). As part of data processing, in some implementations, the change request analysis device 202 removes change request entries that have poor data quality. For example, an entry in the repository may have resulted in actual outcomes that are vastly different from predicted values, which indicates that the input parameters or weights may have been erroneous. Such entries are considered as outliers and are discarded by the change request analysis device 202 during data processing. In some implementations, as part of data processing, the change request analysis device 202 addresses data imbalance. For example, the historical dataset stored in the repository can be imbalanced, with a much larger number of successes compared to failures, or vice versa. Such data imbalance can make training of the ML algorithm challenging. The change request analysis device 202 addresses such data imbalance by intelligently removing entries to balance the dataset. For example, when the number of successes is greater than the number of failures, the change request analysis device 202 removes a number of entries corresponding to the successes until the difference between the two numbers is within an acceptable margin. In some cases, the change request analysis device 202 removes entries unless the two numbers are equal. In some cases, entries that are to be removed are determined based on input from stakeholders, for example, members of the change team.

The change request analysis device also performs feature engineering (222) as part of preparing the data for training. Feature engineering is used to scale parameters that have high dimensionality. For example, an "Assigned To" parameter of a change request can have, as values, identities of the developer(s) to whom change request has been assigned. This parameter can have a high dimension, for example, the number of values of the parameter can be 2000 for 2000 possible developers. The change request analysis device 202 addresses the dimensionality problem by feature engineering. As an example, the change request analysis device 202 can create ratings for the developers that are based on the experience levels of the developers. The ratings can fall in one of a small number of categories, such as three categories corresponding to very experienced, moderately experienced, or novice. The change request analysis device 202 can place each developer into one of these categories based on the developer's experience level, and use the category as an input parameter. In this manner, the dimension of the "Assigned To" parameter can be changed from 2000 to 3.

Once the data has been prepared, the change request analysis device 202 performs data modeling (225). In some implementations, the change request analysis device 202 can use, in the prediction tool, different algorithms, for example, algorithms 116a or 116b. As described previously, in some implementations, the algorithms are ML algorithms, including, for example, neural network (NN) algorithms or decision tree algorithms with feature importance and gradient boosting, or both. The algorithms can also include other types of ML algorithms in other cases, for example, support vector machine (SVM) algorithms, linear or logistic regression algorithms, random forest algorithms, among other suitable types. The change request analysis device 202 accesses the algorithms from memory (230) and applies the prepared dataset to each of the algorithms as used in executions of the prediction tool.

The change request analysis device 202 performs tuning and evaluation (235) of the algorithms that are modeled with the prepared dataset. In some implementations, the change request analysis device 202 divides the prepared dataset into a training set and a test set. The data in the training set is further divided into a number of random sub-samples for cross-validation and the sub-samples are applied as inputs to the prediction tool to train and tune the different machine learning algorithms that are modeled with the training dataset. Once the models have been trained and tuned using the training set, the change request analysis device 202 evaluates the various models using the test set, and selects the algorithm that provides the best results for the prediction tool. In some cases, the change request analysis device 202 evaluates the different algorithms using a variety of metrics to make a selection. For example, the metrics can include a determination about one or more of: which algorithm has the best performance on the test set; which algorithm is the most robust and performs well across various performance metrics; which algorithm has the best cross-validated scores from the training set; or whether each algorithm provides a meaningful outcome for the change request.

In some implementations, the change request analysis device 202 reiterates data preparation, data modeling, and training and evaluation until an algorithm is determined to provide satisfactory performance, for example, providing outputs for change requests in the test set that are within ranges determined to be acceptable by the change team. In some implementations, the change team makes the selection based on metrics such as Average Area under Precision Recall Curve (AUPRC). The value of AUPRC indicates the accuracy in predicting the outcome of a change request using the prediction tool. For example, an AUPRC value of 0.42 signifies that, of all change requests that are predicted to fail, the predictions were accurate for 42%. In some cases, the change team selects the algorithm that provides the highest value of AUPRC compared to other algorithms, with the objective being to increase precision in the outcome predictions by the prediction tool and reduce incorrect predictions, which can be either false positives or false negatives. For example, if algorithm 116a has an AUPRC value of 0.15 while algorithm 116b has an AUPRC value of 0.42, then the change request analysis device 202 selects algorithm 116b.

Once an algorithm is selected based on training and evaluation, the prediction tool is deployed with the selected algorithm and used to predict success probabilities, among other outputs, for new change requests, and the performance of the prediction tool is monitored (240), as described with respect to process 200B below. From time to time, the change team re-runs the process 200A to retrain the prediction tool. For example, the change request analysis device 202 is used with refreshed datasets from the repository, and the different algorithms are modeled using the datasets to determine whether a different algorithm provides better results with the new datasets.

As shown in FIG. 2B, in the process 200B, when the prediction tool is deployed and used, data for a new change request is provided to the prediction tool. In some implementations, the client device 201 receives change request data (245). For example, a member of the change team can input parameters for a new change request through the GUI of the client device 201, which can be similar to the GUI 156. The client device 201 forwards the change request data to the change request analysis device 202 over a network connection, for example, through the network 140.

The change request analysis device 202 prepares the data for training (250). In some implementations, preparing the data for training includes data processing (251), which is similar to data processing (221). Preparing the data for training also includes feature engineering (252), which is similar to feature engineering (222). The change request analysis device 202 runs the prediction tool with the selected algorithm, and applies the prepared data to the prediction tool (255).

The prediction tool processes the prepared data using the selected algorithm and obtains an estimate of the success probability of the change request determined by the algorithm, which is output by the prediction tool as the result of the prediction (260). In some implementations, the selected algorithm applies feature importance to the parameters of the change request and determines a ranking of parameters, which is also output by the prediction tool in such cases. In some implementations, the algorithm also provides recommendations for modifying the change request, for example, modifying values or weights of some parameters. The recommendations are also output as results by the prediction tool in such cases.

The change request analysis device 202 forwards the results output by the prediction tool to the client device 201, for example, to the front-end UI tool running on the client device. The front-end UI tool displays the results (265) on the GUI of the client device 201 using one or more dashboards, for example, dashboards 158a or 158b, or both.

In some implementations, the client device 201 receives further change request data (245). For example, members of the change team, upon reviewing the success probability, parameter ranking, and/or recommendations, displayed using the front-end UI tool, can provide input modifying values or weight of one or more parameters of the change request, for example, to investigate how the success probability changes. In such cases, the client device 201 and the change request analysis device 202 iterates process 200B as described above to obtain updated results from the prediction tool for the modified data.

Optionally, in some implementations, for example, in which an AI algorithm is used in the prediction tool, the prediction tool compares the estimated success probability of the change request with one or more threshold values (270), and determines whether the success probability satisfies the threshold values (275). For example, the AI algorithm determines whether the success probability is greater than a minimum threshold value that set for change requests. In some cases, the prediction tool may be configured such that, if the success probability satisfies the one or more threshold values, then the AI algorithm auto-approves implementation of the requested change (280), without requiring review or approval by the change team. On the other hand, if the success probability fails to satisfy the one or more threshold values, then the AI algorithm does not auto-approve the change request. In such situations, the change request analysis device 202 waits for user input, for example, from a member of the change team, to approve or deny the change request (285).

Figure 3:
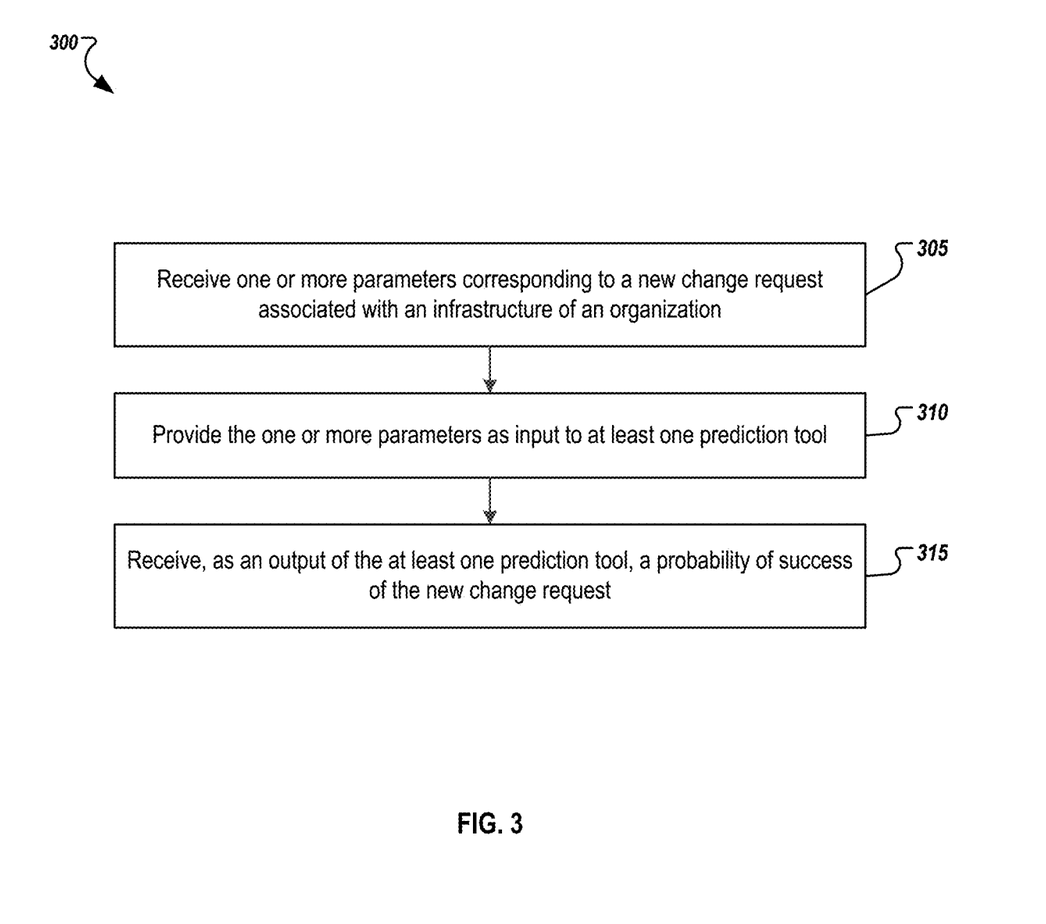
FIG. 3 is a flow chart diagram of an example method for automatically predicting probability of success of a change request for an organization's IT infrastructure in one example implementation.

FIG. 3 is a flow chart diagram of an example method 300 for automatically predicting probability of success of a change request for an organization's IT infrastructure in one example implementation. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 can be performed by the change request analysis device 102 and/or the client device 150, or portions thereof, described in FIG. 1, as well as other components or functionality described in other portions of this description.

In one instance, method 300 describes a method performed within a system of an organization comprising at least one repository, at least one memory, and at least one hardware processor interoperably coupled with the at least one memory and the at least one repository. For example, the system 100 includes repository 120, memory 110 and processors 106 and 154. The at least one repository stores information corresponding to one or more prior change requests associated with an IT infrastructure of the organization, for example, IT systems or services of the organization. For example, the repository 120 stores entries with information about prior change requests. Each change request corresponds to a request for a modification to one or more components of the infrastructure. The at least one memory stores instructions and at least one prediction tool. For example, the memory 110 stores instructions 112 and prediction tool 114. The instructions instruct the at least one hardware processor to perform particular operations, for example, including the operations described below.

The method 300 starts by receiving one or more parameters corresponding to a new change request associated with the infrastructure of the organization (305). For example, the processor 106 of the change request analysis device 102 receives, from the client device 150 through the network interface 104, parameters for a change request associated with the IT infrastructure of the organization. The parameters for the change request, which are similar to those described with respect to FIG. 1, are received in some implementations by the client device 150. For example, a member of the change team of the organization inputs the parameters through an input mechanism associated with the client device 150, which forwards the parameters to the change request analysis device 102 through the network 140.

The one or more parameters are provided as input to the at least one prediction tool (310). For example, the processor 106 runs the prediction tool 114 and provides the change request parameters as input to the prediction tool. The prediction tool 114 applies the parameters to the algorithm, for example, algorithm 116a or 116b, which is selected, based on training and evaluation, for predicting success probabilities of change requests.

A probability of success of the new change request is received as an output of the at least one prediction tool (315). For example, the algorithm used by the prediction tool 114 estimates a success probability of the new change request based on the parameters of the change request that are input to the prediction tool. The prediction tool 114 outputs the estimated success probability as a result of running the algorithm. In some implementations, the processor 106 forwards the estimated success probability to the front-end UI tool running on the client device 150 through the network 140. The front-end UI tool presents the predicted success probability using one or more dashboards, for example, dashboard 158a or 158b, on the GUI 156 shown on the display of the client device 150.

As described previously, in some implementations, in addition or as an alternative to the success probability, the prediction tool 114 uses the algorithm to determine a ranking of the change request parameters that reflect their relative importance, or recommendations for modifying one or more parameters, or both. In such implementations, the ranking of the parameters and/or the recommendations are output by the prediction tool, and forwarded by the processor 106 to the front-end UI tool on the client device 150. The front-end UI tool presents the ranking of the parameters and/or the recommendations for modifications on the GUI 156 using one or more of the dashboards 158a and 158b.

Figure 4:
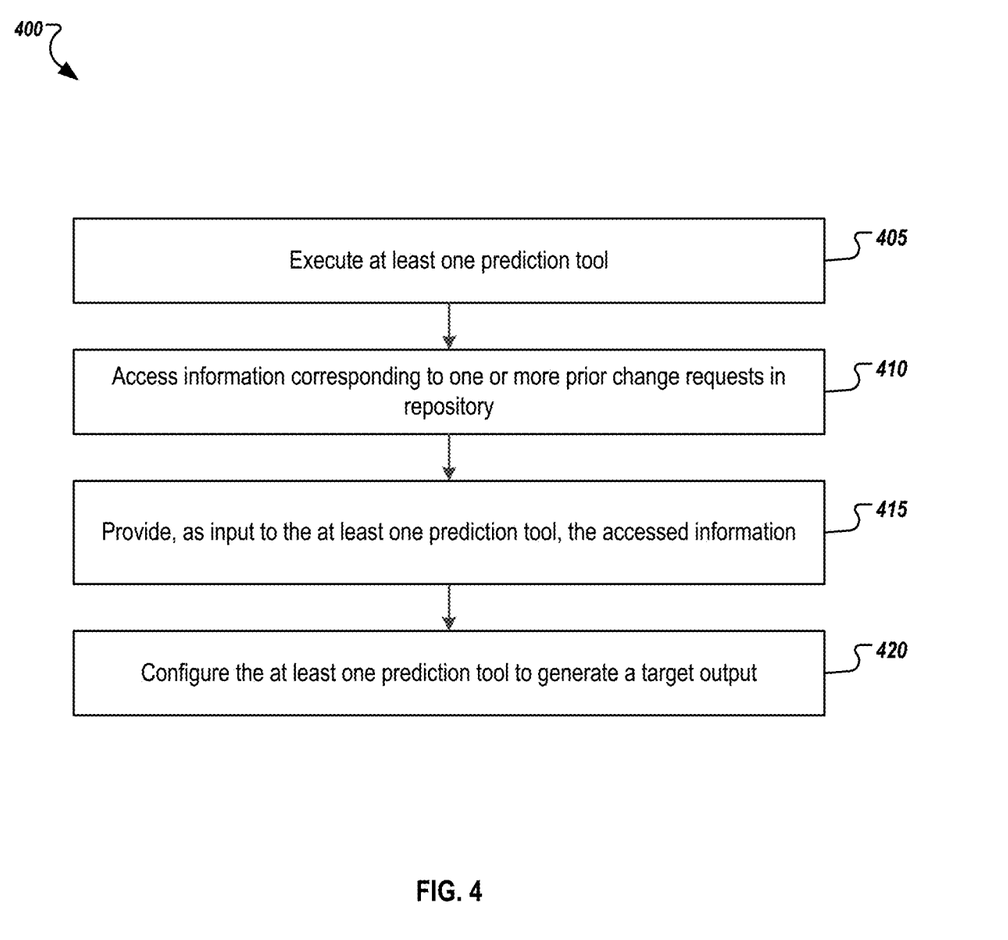
FIG. 4 is a flow chart diagram of an example method for training a prediction tool to automatically predict a probability of success of a change request for an organization's IT infrastructure in one example implementation.

FIG. 4 is a flow chart diagram of an example method 400 for training a prediction tool to automatically predict a probability of success of a change request for an organization's IT infrastructure in one example implementation. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate. In some instances, method 400 can be performed by the change request analysis device 102 and/or the client device 150, or portions thereof, described in FIG. 1, as well as other components or functionality described in other portions of this description.

In one instance, method 400 describes a method performed within a system of an organization comprising at least one repository, at least one memory, and at least one hardware processor interoperably coupled with the at least one memory and the at least one repository. For example, the system 100 includes repository 120, memory 110 and processors 106 and 154. The at least one repository stores information corresponding to one or more prior change requests associated with an IT infrastructure of the organization, for example, IT systems or services of the organization. For example, the repository 120 stores entries with information about prior change requests. Each change request corresponds to a request for a modification to one or more components of the infrastructure. The at least one memory stores instructions and at least one prediction tool. For example, the memory 110 stores instructions 112 and prediction tool 114. The instructions instruct the at least one hardware processor to perform particular operations, for example, including the operations described below.

The method 400 starts by executing at least one prediction tool (405). For example, the processor 106 of the change request analysis device 102 loads, from memory 110, software routines corresponding to the prediction tool 114 and executes the routines to run the prediction tool 114. In some implementations, a member of the change team of the organization controls the processor 106 to run the prediction tool 114. For example, the member of the change team can provide an input through an input mechanism associated with the client device 150, which forwards the input to the change request analysis device 102 through the network 140, resulting in triggering the processor 106 to execute the prediction tool 114.

Information corresponding to one or more prior change requests in the repository are accessed (410). For example, the processor 106 communicates with the repository 120 through the network interface 104, and accesses historical change request dataset, such as information about prior change requests that are stored in the repository 120. The information includes, in one or more entries for each change request, change request identifier 122, input parameters 124, parameter weights 126, predicted values 128 and observed results 130, among other suitable information.

The accessed information is provided as input to the at least one prediction tool (415). For example, the processor 106 prepares the change request dataset obtained from the repository 120, including, for example, processing to balance the dataset and feature engineering to address dimensionality issues. The processor 106 provides the prepared dataset to the prediction tool 114.

The at least one prediction tool is configured to generate a target output (420). For example, the processor 106 models the one or more algorithms 116a and 116b that are used in the prediction tool 114 with the prepared dataset, and tunes and evaluates the algorithms as described previously, reviewing results output by the algorithms based on the prepared dataset. The processor 106 reiterates the data retrieval, data preparation and tuning and evaluation until at least one algorithm is determined to provide satisfactory performance, for example, by providing results that correspond to target results specified for the prediction tool. Of the one or more algorithms that provide satisfactory performance, the processor 106 selects, based on one or more metrics such as AUPRC values, one algorithm for use in the prediction tool 114 to predict success probabilities for new change requests. If a single algorithm is determined to provide satisfactory performance, that algorithm is selected for use in the prediction tool 114. The prediction tool 114 with the selected algorithm is subsequently used for new change requests.

As described previously, in some implementations, in addition or as an alternative to the success probability, the prediction tool 114 uses the algorithm to determine a ranking of the change request parameters that reflect their relative importance, or recommendations for modifying one or more parameters, or both. In such implementations, the ranking of the parameters and/or the recommendations are output by the prediction tool, and forwarded by the processor 106 to the front-end UI tool on the client device 150. The front-end UI tool presents the ranking of the parameters and/or the recommendations for modifications on the GUI 156 using one or more of the dashboards 158a and 158b.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   at least one repository storing information corresponding to one or more prior change requests associated with an information technology (IT) infrastructure of an organization, each change request corresponding to a request for a modification to one or more sections of the IT infrastructure;
   at least one memory storing (i) instructions and (ii) at least one prediction tool;
   at least one hardware processor interoperably coupled with the at least one memory and the at least one repository, wherein the instructions instruct the at least one hardware processor to:
   receive one or more parameters corresponding to a new change request associated with the IT infrastructure;
   provide the one or more parameters as input to the at least one prediction tool;
   in response to providing the one or more parameters as input to the at least one prediction tool, receive an output of the at least one prediction tool, the output of the at least one prediction tool comprising a probability of success of the new change request, and an ordering of the parameters corresponding to the new change request in accordance with estimated impact of each parameter in the probability of success of the new change request; and provide the output of the at least one prediction tool to a graphical user interface (GUI) tool; and the GUI tool interoperably coupled with the at least one hardware processor, wherein the instructions instruct the at least one GUI tool to:

generate one or more user interfaces displaying the output of the at least one prediction tool, wherein displaying the output of the at least one prediction tool comprises displaying the probability of success of the new change request, and the ordering of the parameters corresponding to the new change request in accordance with estimated impact of each parameter in the probability of success of the new change request.

2. The system of claim 1, wherein the instructions further instruct the at least one hardware processor to train the at least one prediction tool, the training comprising:

executing the at least one prediction tool;

accessing the information corresponding to one or more prior change requests in the repository;

providing, as input to the at least one prediction tool, the accessed information; and based on providing the accessed information as input to the prediction tool, configuring the at least one prediction tool to generate a target output.

3. The system of claim 2, wherein providing the accessed information as input to the at least one prediction tool comprises:

determining, using the accessed information, a first subset of the one or more prior change requests that corresponded to successful changes;

determining, using the accessed information, a second subset of the one or more prior change requests that corresponded to failed changes;

comparing the first subset to the second subset;

removing, based on the comparison, one or more change requests from one of the first subset or the second subset such that a difference between remaining numbers of change requests in the first subset and the second subset are within a threshold value; and providing information corresponding to the remaining numbers of change requests in the first subset and the second subset to the at least one prediction tool.

4. The system of claim 2, wherein providing the accessed information as input to the at least one prediction tool comprises providing parameters corresponding to the one or more prior change requests as input to the at least one prediction tool, the parameters including a first parameter having a plurality of possible values, and wherein the instructions instruct the at least one hardware processor to:

assign values of the first parameter corresponding to the one or more prior change requests to one of a number of specified groups, wherein the number of specified groups is less than a number corresponding to the plurality of possible values; and for each of the one or more prior change requests, provide as input to the at least one prediction tool, a respective specified group as a replacement of the first parameter.

5. The system of claim 2, wherein providing the accessed information as input to the at least one prediction tool comprises providing parameters corresponding to the one or more prior change requests as input to the at least one prediction tool, each parameter having an associated weight representing an estimated impact of the parameter in the probability of success of the new change request, and wherein configuring the at least one prediction tool comprises adjusting weights of one or more parameters to vary the output generated by the at least one prediction tool.

6. The system of claim 1, wherein the output of the at least one prediction tool further comprises one or more recommendations for modifying the new change request.

7. The system of claim 6, wherein the one or more recommendations for modifying the new change request comprises recommendations for modifying at least one of the one or more parameters, or modifying one or more tasks to be performed to effect the requested modification associated with the new change request.

8. The system of claim 1, wherein the instructions further instruct the at least one hardware processor to:

store the output received from the at least one prediction tool in a database.

9. The system of claim 8, wherein storing the output in a database comprises:

storing the output along with information corresponding to the new change request in the at least one repository.

10. The system of claim 1, wherein the GUI tool is further configured to:

enable a user to enter, using an input mechanism coupled to the GUI tool, the one or more parameters corresponding to the new change request, including enabling the user to adjust values associated with the one or more parameters to vary the probability of success of the new change request output by the at least one prediction tool; and provide the one or more parameters entered by the user to the at least one hardware processor.

11. The system of claim 1, wherein the instructions instruct the at least one hardware processor to:

compare the probability of success of the new change request output by the at least one prediction tool to one or more threshold values; and in response to determining that the probability of success satisfies one or more criteria corresponding to the one or more threshold values, approve execution of the new change request, wherein a change request team of the organization is tasked with implementing a modification of the IT infrastructure corresponding to the new change request.

12. The system of claim 1, wherein the instructions further instruct the at least one hardware processor to:

analyze the one or more parameters corresponding to the new change request using the information corresponding to the one or more prior change requests stored in the repository;

determine, based on the analysis, a risk of failure of the new change request;

compare the risk of failure to one or more threshold values; and in response to a determination, based on the comparison, that the risk of failure is greater than the one or more threshold values, generate an alert about the risk of failure, wherein the alert triggers additional scrutiny of the new change request by a change request team of the organization.

13. The system of claim 1, wherein at least one of the information corresponding to the one or more prior change requests or one or more parameters corresponding to the new change request includes one or more of the following:

number of members of a change request team of the organization assigned to implement the respective modification, experience level of the members assigned to implement the respective modification, number of tasks to be performed to implement the respective modification, whether a time period assigned to implement the respective modification a normal time period or an expedited time period, a level of complexity of the change request, a requester who is requesting the change request, a level of difficulty in realizing the respective modification, a level of risk in implementing the respective modification, a weight assigned to a parameter, whether the prior change request was approved and the respective modification implemented, whether the respective modification for a prior change request successful or failed, or for a failed modification of a prior change request, level of severity of an impact of the failure on the IT infrastructure of the organization.

14. The system of claim 1, wherein the at least one prediction tool includes a machine learning algorithm that is one of an artificial neural network, or a decision tree model having one or more of feature importance or gradient boosting.

15. A non-transitory computer-readable medium storing computer-readable instructions executable by one or more hardware processors and configured to instruct the one or more hardware processors to:

receive one or more parameters corresponding to a change request associated with an information technology (IT) infrastructure of an organization, wherein the change request corresponds to a request for a modification to one or more sections of the IT infrastructure;

provide the one or more parameters as input to at least one prediction tool;

in response to providing the one or more parameters as input to the at least one prediction tool, receive an output of the at least one prediction tool, the output of the at least one prediction tool comprising a probability of success of the change request, and an ordering of the parameters corresponding to the change request in accordance with estimated impact of each parameter in the probability of success of the change request; and display, using one or more user interfaces, the output of the at least one prediction tool, wherein displaying the output of the at least one prediction tool comprises displaying the probability of success of the change request, and the ordering of the parameters corresponding to the change request in accordance with estimated impact of each parameter in the probability of success of the change request.

16. The non-transitory computer-readable medium of claim 15, wherein the instructions further instruct the one or more hardware processors to train the at least one prediction tool, the training comprising:

executing the at least one prediction tool;

accessing, from a repository storing one or more prior change requests associated with the IT infrastructure, information corresponding to the one or more prior change requests;

providing, as input to the at least one prediction tool, the accessed information; and based on providing the accessed information as input to the at least one prediction tool, configuring the at least one prediction tool to generate a target output.

17. The non-transitory computer-readable medium of claim 15, wherein the at least one prediction tool includes a machine learning algorithm that is one of an artificial neural network, or a decision tree model having one or more of feature importance or gradient boosting.

18. A computerized method performed by one or more processors, the method comprising:

receiving one or more parameters corresponding to a change request associated with an information technology (IT) infrastructure of an organization, wherein a change request corresponds to a request for a modification to one or more sections of the IT infrastructure;

providing the one or more parameters as input to at least one prediction tool; and in response to providing the one or more parameters as input to the at least one prediction tool, receiving an output of the at least one prediction tool, the output of the at least one prediction tool comprising a probability of success of the change request, and an ordering of the parameters corresponding to the change request in accordance with estimated impact of each parameter in the probability of success of the change request; and displaying, using one or more user interfaces, the output of the at least one prediction tool, wherein displaying the output of the at least one prediction tool comprises displaying the probability of success of the change request, and the ordering of the parameters corresponding to the change request in accordance with estimated impact of each parameter in the probability of success of the change request.

19. The computerized method of claim 18, further comprising training the at least one prediction tool, wherein the training comprises:

executing the at least one prediction tool;

accessing, from a repository storing one or more prior change requests associated with the IT infrastructure, information corresponding to the one or more prior change requests;

providing, as input to the at least one prediction tool, the accessed information; and based on providing the accessed information as input to the prediction tool, configuring the at least one prediction tool to generate a target output.

20. The computerized method of claim 18, further comprising:

comparing the probability of success of the new change request output by the at least one prediction tool to one or more threshold values; and in response to determining that the probability of success satisfies one or more criteria corresponding to the one or more threshold values, approving execution of the change request, wherein a change request team of the organization is tasked with implementing a modification of the IT infrastructure corresponding to the change request.

21. The computerized method of claim 20, further comprising:

analyzing the one or more parameters corresponding to the change request using the information corresponding to the one or more prior change requests stored in the repository;

determining, based on the analysis, a risk of failure of the change request;

comparing the risk of failure to one or more threshold values; and in response to a determination, based on the comparison, that the risk of failure is greater than the one or more threshold values, generating an alert about the risk of failure, wherein the alert triggers additional scrutiny of the new change request by a change request team of the organization.

* * * * *